US012327682B1

United States Patent
Omran et al.

(10) Patent No.: US 12,327,682 B1
(45) Date of Patent: Jun. 10, 2025

(54) NANOHYBRID SUPERCAPACITORS FOR ENERGY STORAGE

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/062,314

(22) Filed: Feb. 25, 2025

(51) Int. Cl.
*H02J 7/00* (2006.01)
*H01G 11/26* (2013.01)
*H01G 11/42* (2013.01)

(52) U.S. Cl.
CPC ............ *H01G 11/42* (2013.01); *H01G 11/26* (2013.01); *H02J 7/00* (2013.01)

(58) Field of Classification Search
CPC ...... H02J 7/345; H02J 2207/50; H01G 11/42; H01G 11/26
USPC .................................................. 320/166, 167
See application file for complete search history.

(56) References Cited

U.S. PATENT DOCUMENTS

| 11,915,871 | B2 * | 2/2024 | Wei ........................ H01G 11/32 |
| 2013/0168228 | A1 | 7/2013 | Ozin et al. |
| 2024/0309526 | A1 * | 9/2024 | Mohamed ............. C25B 11/067 |

FOREIGN PATENT DOCUMENTS

| CN | 111564321 A | 8/2020 |
| CN | 117691033 A | 3/2024 |

OTHER PUBLICATIONS

Lin Liu, et al., "Facile synthesis of graphitic carbon nitride/nanostructured α-Fe2O3 composites and their excellent electrochemical performance for supercapacitor and enzyme-free glucose detection applications", Applied Surface Science, vol. 390, Dec. 30, 2016, pp. 303-310, 38 pages.

Guo Le, et al., "Building g-C3N4/Fe2O3 heterojunctions on carbon nanotubes for enhanced electron conductivity and pseudocapacitive performances". Journal of Materials Science: Materials in Electronics, vol. 34, Article 2324, Dec. 15, 2023, 11 pages.

* cited by examiner

*Primary Examiner* — Nathaniel R Pelton
(74) *Attorney, Agent, or Firm* — Oblon, McClelland, Maier & Neustadt, L.L.P.

(57) ABSTRACT

A method of storing electrical charge may include charging a capacitor, including an anode and/or a cathode layer, further including a nanocomposite which includes graphitic $C_3N_4$, $Fe_2O_3$, and $MgAl_2O_4$ in a mass relationship to each other in a range of from 5 to 15:2 to 7:75 to 95, with alternating current at a frequency in a range of from 1 to 15 MHz.

20 Claims, 6 Drawing Sheets

NANOHYBRID SUPERCAPACITORS FOR ENERGY STORAGE

BACKGROUND

Technical Field

The present disclosure is directed towards use of nanohybrids for storing electrical energy, and more particularly, relates to a method of storing electrical charge using a nanocomposite including graphitic $C_3N_4$, $Fe_2O_3$, and $MgAl_2O_4$.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The increasing global population and demand for energy have resulted in energy crises and environmental concerns such as global warming. Currently, energy is predominantly obtained from non-renewable sources like fossil fuels, which are economically taxing and further contribute significantly to environmental pollution and depletion of energy reserves, as described by Imtiaz, et al. *Diamond Rel. Mater.* 2024, 145, 111110, which is incorporated by reference herein. Consequently, researchers have been focusing on finding alternative renewable energy sources that are sustainable and environmentally friendly, such as solar and wind energy. However, certain renewable energy sources are dependent on weather conditions, which necessitates the development of efficient energy storage systems to ensure consistent energy availability.

In order to address energy storage challenges, various energy storage technologies such as supercapacitors (SCs), fuel cells, and lithium-ion (Li-ion) batteries have been developed. Among these, SCs are considered favourable since SCs include certain desirable characteristics such as, low cost, eco-friendliness, longer cyclic life, high specific energy (E), and high specific power. Compared to conventional batteries, SCs offer superior capacitance and rapid charging/discharging capabilities. SCs play a crucial role in energy storage devices across multiple applications. SCs are classified into two major categories based on charge storage mechanisms: pseudo-capacitors (PCs) and electric double-layer capacitors (EDLCs). Recent developments have led to the emergence of hybrid SCs, which combine the properties of both EDLCs and PCs, utilizing materials such as carbon-based substances and transition metal oxides/chalcogenides. Among the promising electrode materials, transition metal oxides with various oxidation states and spinel structures have been identified as highly effective for catalysts, SCs, and Li-ion batteries due to enhanced redox properties of transition metal oxides. The spinel phase, represented by the general formula $AB_2O_4$, includes a combination of one divalent cation ($A^{2+}$) and two trivalent cations ($B^{3+}$), as described by Sickafus, et al. *J. Am. Ceram. Soc.* 2005, 82(12), 3279-3292; and Wyckoff, R. W. G. *Crystal Structures,* 2nd Ed., Vol. 2 Wiley Interscience, New York: 1964, each of which is incorporated by reference herein. In general, a unit cell of the spinel structure includes a face-centered cubic arrangement of oxygen ions, hosting 32 O ions, 64 tetrahedral sites, and 32 octahedral sites which are occupied with $A^{2+}$ and $B^{3+}$ cations. When one half of the octahedral interstices are occupied by the $B^{3+}$ cations and one eighth of the tetrahedral sites are occupied by the $A^{2+}$ cations the spinel phase is called "normal." Whereas, when tetrahedral sites are occupied by half of the $B^{3+}$ and octahedral sites are occupied by the other half and $A^{2+}$ the spinel phase is called "inverse." An example of spinel-phase materials is magnesium aluminate ($MgAl_2O_4$), which exhibits exceptional properties such as high thermal stability (melting point of 2135° C.), high hardness (16 GPa), high mechanical resistance, chemical resistance, wide band gap energy, and relatively low thermal expansion coefficient within a broad temperature range of about 30° C. to 1400° C. The aforementioned properties make $MgAl_2O_4$ suitable for applications in metallurgical, electrochemical, radio-technical, and chemical industries.

Several methods have been developed for synthesizing the $MgAl_2O_4$ phase, including conventional solid-state reactions, sol-gel processing, spray drying, co-precipitation, microwave processing, hydrothermal techniques, and organic gel-assisted citrate complexation, as described by Ganesh, et al. *Ceram. Int.* 2005, 31, 67-74; Adak, et al. *Mater. Sci. Lett.* 1997, 16, 234-235; Ryshekewitch, E. *Oxide Ceramics*, Academic Press, New York: 1960; and Kostic, et al. *Ceramurgia Int.* 1977, 3, 57-60, each of which is incorporated by reference herein. Despite these advancements, studies on the electrical properties of $MgAl_2O_4$ remain limited. Evaluations conducted using AC impedance spectroscopy in a frequency range of 0.1 Hz to 10 kHz have revealed the impact of environmental factors such as relative humidity on the electrical behavior of the material.

Recent research efforts have explored the doping of $MgAl_2O_4$ with vanadium to enhance electrical and physical properties of $MgAl_2O_4$. Additionally, graphitic carbon nitride (g-$C_3N_4$) has gained significant attention as a metal-free photocatalyst due to high thermal and chemical stability, semiconductor properties, and optical features. Graphitic-$C_3N_4$ has shown potential for applications in hydrogen generation, pollutant decomposition, and energy storage devices, as described by Wang, et al. *Nature Mater.* 2009, 8, 76-80; Su, et al. *J. Am. Chem. Soc.* 2010, 132, 16299-16301; and Yan, et al. *Langmuir,* 2010, 26, 3894-3910, each of which is incorporated by reference herein. When combined with $MgAl_2O_4$, the resulting composite materials may exhibit improved electrochemical performance owing to increased active sites, enhanced electrical conductivity, and superior wettability.

Despite the promising properties of SCs and subsequent potential applications, several limitations hinder their adoption. Current synthesis methods often involve complex processes, high energy consumption, and expensive raw materials. Additionally, SCs typically suffer from low energy density compared to traditional batteries, making them less suitable for applications requiring prolonged energy storage. The dependence on specific environmental conditions, such as humidity and temperature, further complicates their practical implementation. Furthermore, the reduced surface area and electrical conductivity of stand-alone g-$C_3N_4$ limits the specific capacitance and overall electrochemical performance of the SCs. The combination of g-$C_3N_4$ with spinel-based materials has shown promise, however, challenges remain in achieving uniform dispersion and maintaining long-term stability under operational conditions.

Accordingly, one object of the present disclosure is to provide a method of electrical charge storage using nanohybrids that may circumvent the above listed drawbacks and limitations of the methods known in the art.

SUMMARY

In an exemplary embodiment, a method of storing electrical charge may include charging a capacitor, including an anode and/or a cathode layer, further including a nanocomposite which includes graphitic $C_3N_4$, $Fe_2O_3$, and $MgAl_2O_4$ in a mass relationship to each other in a range of from 5 to 15:2 to 7:75 to 95, with alternating current at a frequency in a range of from 1 to 15 MHz.

The average pore distribution of the nanocomposite may be unimodal. The Brunauer-Emmett-Teller (BET) specific surface area of the nanocomposite may be in a range of 15 $m^2/g$ to 45 $m^2/g$ (23.88 $m^2/g$), and/or an average pore diameter of the nanocomposite, according to Barrett-Joyner-Halenda (BJH) measurement method, may be in a range of 6.3 nanometers (nm) to 10.03 nm (8.3 nm), with a second average pore diameter of the second mode of the nanocomposite, according to BJH measurement method, being in a range of 7.5 nm to 13 nm (10.87 nm), and/or an average pore volume of the nanocomposite, according to the BJH measurement method, may be in a range of from 0.06 $cm^3/g$ to 0.12 $cm^3/g$ (0.09 $cm^3/g$).

The nanocomposite may have a (311) spinel interplanar spacing in a range of from 0.210 to 0.290 nm (0.25 nm), a (006) $Fe_2O_3$ interplanar spacing in a range of from 0.180 to 0.260 nm (0.22 nm), a (400) spinel interplanar spacing in a range of from 0.140 to 0.220 nm (0.18 nm), a (220) MgO interplanar spacing in a range of 0.108 to 0.188 (0.148 nm), a (620) spinel interplanar spacing in a range of from 0.090 to 0.170 (0.13 nm), and/or a (119) $Fe_2O_3$ and (622) $Fe_2O_3$ spinel interplanar spacing in a range of from 0.080 to 0.160 (0.12 nm), according to selected area diffraction (SAED).

The mass relationship of the nanocomposite may be in a range of 9 to 11:4 to 6:84 to 86. The nanocomposite may have a (311) spinel interplanar spacing of 0.25±2% nm, a (006) $Fe_2O_3$ interplanar spacing of 0.22±2% nm, a (400) spinel interplanar spacing of 0.18±2% nm, a (220) MgO interplanar spacing of 0.148±2% nm, a (620) spinel interplanar spacing of 0.13±2% nm, and a (119) $Fe_2O_3$, and/or (622) $Fe_2O_3$ spinel interplanar spacing of 0.12±2% nm. Further, the nanocomposite has an X-ray diffraction (XRD) spectrum of the nanocomposite under Cu-filtered Cu-Kα radiation (1.5418 Å) powered at 45 kV and 10 mA with 20 peaks of an $MgAl_2O_4$ spinel phase at 18.9±1°, 31.7±1°, 44.8±1°, 56.2±1°, 74.09±1°, and/or 78.1±1°, an MgO cubic phase at 42.8±1°, 62.2±1°, and/or 74.6±1°, an $Fe_2O_3$ hexagonal phase at 36.9±1°, 44.8±1°, 59.6±1°, and/or 67.3±1°, and/or g-$C_3N_4$-related diffractions at 27.8±1°, 36.8±1°, 44.6±1°, and/or 67.3±1°, and/or where no more than 1, 0.75, 0.5, 0.25, 0.1, 0.01, 0.001, 0.0001, or 0.00001% relative intensity $MgFe_2O_4$ (or none) is detected in the XRD spectrum.

The charging may be at a frequency in a range of from 5 to 13 MHz. An anode and/or a cathode layer including the nanocomposite, in operation, may become an electric double-layer of conductor-rich grains separated by conductor-poor grain boundaries, and the anode and/or a cathode layer including the nanocomposite forms an array of homogeneous spherical metal oxides nanoparticles having an average largest diameter in a range of from 5.5 to 8.5 nm (7.0±1.5, 1, 0.75, 0.67, 0.5, 0.33, 0.25, 0.125, 0.1, 0.05, or 0.01 nm) on a porous structured layer comprising curled and/or wrinkled nanosheets and platelets of the g-$C_3N_4$.

Carbon materials in the nanocomposite may include no more than inevitable traces of nanotubes, relative to total nanocomposite weight.

The nanocomposite may include no more than 1 percent by weight (wt. %) of carbonaceous materials besides graphitic $C_3N_4$.

The nanocomposite may include no more than 1 wt. % of sulfides, relative to total nanocomposite weight.

The nanocomposite may include no more than 0.5 wt. % of Bi.

The nanocomposite may include no more than 1 wt. % elemental state Fe, relative to total nanocomposite weight.

The nanocomposite may include no more than 1 wt. % elemental state metal, relative to total nanocomposite weight.

The nanocomposite may include no more than 1 wt. % $MnO_2$, relative to total nanocomposite weight.

The nanocomposite may include no more than inevitable traces of a mercaptan, amine, and/or carboxylic acid functional groups.

The nanocomposite may include no more than inevitable traces of C—N heterocycles (pyridine), and the nanocomposite may include no more than inevitable traces of silyl functions.

Relative to a total metal oxide weight, the nanocomposite may include no more than 10 wt. % MgO, and no more than 1 wt. % $ZrO_2$.

The nanocomposite includes no more than 10 wt. %, individually or in any combination, of ZnO, $Fe_3O_4$, $CeFeO_3$, $GdFeO_3$, $LaFeO_3$, $BaTiO_3$, $CaTiO_3$, $SrTiO_3$, $CaZrO_3$, $PbTiO_3$, $Mg_{1-x}Ni_xFe_2O_4$ (x=0.0, 0.6, 1.0), Ag, $CoFe_2O_4$, $CuFe_2O_4$, $MnFe_2O_4$, $NiFe_2O_4$, $ZnFe_2O_4$, $Cu_{1-x}Cd_xFe_2O_4$, $Zn_{0.7}Ni_{0.15}Cu_{0.15}Fe_2O_4$, $Zn_{0.3}Ni_{0.7-x}Co_xFe_2O_4$ (0≤x≤0.7), $Mn_{0.1}Mg_{0.2}(Co, Ni, Zn)_{0.7}Fe_2O_4$, $LaCo_{0.5}Fe_{0.5}O_3$, $Mg_{0.1}$—$Co_{0.9}Fe_2O_4$, $La_{1-x}Gd_xCr_{1-y}Ni_yO_3$, $Gd_2FeCrO_6$, $KTaO_3$, $NaTaO_3$, $NaNbO_3$, $KNbO_3$, $Mg_{1-x}Ni_xFe_2O_4$, $Cu_{0.5}Cd_{0.25}Co_{0.25}Fe_{2-x}O_4$, $Zn_{0.5}Co_{0.5}La_xFe_{2-x}O_4$, $Pr_2Ti_2O_7$, $SiO_2$, $TiO_2$, ZnO, ZnS, $Bi_4O_5I_2$, $SrFe_{0.5}Ta_{0.5}O_3$, $La_{0.8}Ba_{0.2}TiO_{3.5-δ}$, $LaTiO_{3.5-δ}$, $NaNbO_3$, and $LaFeO_3$.

The nanocomposite may include no more than 10 wt. %, individually or in any combination, relative to total metal content, of any of Zn, Ce, Gd, La, Ba, Ti, Ca, Sr, Zr, Pb, Ni, Ag, Co, Cu, Mn, Cd, Ta, Nb, Pr, and Bi, and the nanocomposite includes no more than 1 wt. %, individually or together, relative to total carrier weight, of $SiO_2$, $TiO_2$, ZnO, and ZnS.

The nanocomposite may include no more than 5 atomic percent (at. %) Fe(III) ions, relative to total iron atoms in the nanocomposite.

The nanocomposite may include no more than 1 wt. %, individually or in any combination, of $SrTiO_3$, Au, $SnO_2$, and SnO.

The graphitic $C_3N_4$ may have no more than 10%, based on its total volume, with a honeycomb structure.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

The present disclosure is related to nanotechnology. As used herein, the term 'nanotechnology' refers to a field of science and technology involving the manipulation, design, and application of materials, structures, and devices at the nanometer scale, typically between 1 and 100 nanometers. The properties and behaviors of the materials may differ significantly from those at the macro scale, thereby enabling enhanced functionality and performance in various applications.

The present disclosure includes electrical applications. As used herein, the term 'electrical applications' refers to the use of electrical principles, devices, and systems in the transmission, distribution, control, or conversion of electrical energy or signals, including but not limited to power generation, storage, processing, and communication, such applications are designed to enhance efficiency, functionality, or performance in electronic, electrical, or energy-related systems.

As used herein, the term 'supercapacitor' refers to an energy storage device that stores electrical energy through the electrostatic separation of charge, employing high surface area electrodes and an electrolyte. The device is capable of rapid charge and discharge cycles, providing high power density compared to conventional capacitors, and exhibiting greater charge retention than typical batteries.

As used herein, the term 'energy storage' refers to the process or technology of capturing and storing energy for later use, typically involving the conversion of electrical energy into a form that can be retained and subsequently retrieved as needed. Such energy storage systems may include batteries, supercapacitors, and other devices that store energy in chemical, electrostatic, or other forms for efficient delivery on demand.

As used herein, the term 'anode' refers to the electrode in an electrical device, such as a battery, capacitor, or electrochemical cell, where oxidation occurs. It is the terminal through which current flows into the device from an external circuit in the case of discharging. For a battery, during discharge, the anode releases electrons that flow through the external circuit, while ions move within the device to balance the charge. In a capacitor, the anode is one of the two electrodes where charge is stored, typically paired with a cathode. The specific function of the anode depends on the device, but its primary role is always related to facilitating electron flow and maintaining charge balance during the electrochemical reaction.

As used herein, the term 'cathode' refers to the electrode in an electrical device, such as a battery, capacitor, or electrochemical cell, where reduction occurs. The cathode is the terminal through which current flows out of the device when it is discharging. During the discharge process in a battery, the cathode accepts electrons that flow through the external circuit from the anode, and the ions move within the device to balance the charge. In a capacitor, the cathode is one of the two electrodes where charge is stored, working in conjunction with the anode. The cathode is where the electrochemical reaction results in the gain of electrons, completing the electrical circuit and enabling energy storage or release.

As used herein, the term 'electric double-layer (EDL)' refers to a charge structure formed at the interface between a conductive electrode and an electrolyte. It consists of two layers: the inner layer, where ions are tightly adsorbed to the electrode surface with opposite charge, and the outer diffuse layer, where ions are loosely associated with the electrode. This double-layer configuration enables energy storage by separating charges at the electrode-electrolyte interface, which is fundamental to the operation of electrochemical devices like capacitors and supercapacitors.

As used herein, the term 'conductor-rich grains' refer to regions within a material where there is a high concentration of conductive elements or phases, typically metals or conductive compounds. These grains have enhanced electrical conductivity due to the abundance of charge carriers such as electrons. In the context of nanocomposites or electrode materials, conductor-rich grains are essential for facilitating efficient electron transport and improving the overall conductivity of the material.

As used herein, the term 'conductor-poor grain boundaries' refer to the regions between conductive grains where the concentration of conductive elements is significantly lower, resulting in reduced electrical conductivity. These boundaries can act as barriers to electron flow, limiting the overall conductivity of the material. In certain materials, conductor-poor grain boundaries are used strategically to influence charge storage and distribution, enhancing specific properties like capacitance or stability.

As used herein, the term 'nanoparticles (NPs)' refers to particles having a particle size of 1 nanometer (nm) to 500 nm within the scope of the present disclosure.

As used herein, the term 'nanocomposite' is a material that is made by combining a matrix (often a polymer, metal, or ceramic) with NPs or nanocomposites to enhance its properties. The NPs are typically on the scale of nm (1 to 100 nm), and their small size and high surface area can significantly improve the composite material's strength, thermal stability, electrical conductivity, optical properties, and other characteristics.

As used herein, the term 'bimodal' refers to a distribution or pattern that has two distinct peaks or modes. In the context of particle size or material properties, it indicates that the sample consists of two predominant groups of particles or components, each with a different size or characteristic, rather than a single, uniform distribution.

As used herein, the term 'pore volume' refers to the total volume of void spaces (pores) within a material that are capable of being filled by a gas or liquid. It is typically expressed in cubic centimeters per gram ($cm^3/g$) and is an important parameter in characterizing the porous structure of materials, such as adsorbents or catalysts. As used herein, the term 'pore diameter' refers to the average width or size of the pores (void spaces) within a material, typically measured in nm or angstroms (Å). It is a key parameter in characterizing the texture and permeability of porous materials, influencing their adsorption, filtration, or catalytic properties. Pore diameter is often determined using methods such as nitrogen adsorption or mercury intrusion, which provide insights into the material's ability to absorb or interact with molecules of specific sizes. As used herein, the term 'spinel interplanar spacing' refers to the distance between parallel planes of atoms in the crystal structure of a spinel material. Spinel is a type of mineral with a specific crystalline arrangement, represented by the general formula $AB_2O_4$, where 'A' and 'B' are metal ions. The interplanar spacing is crucial for understanding the material's structural properties and is typically measured using X-ray diffraction (XRD) techniques.

As used herein, the term 'Knop's phenomenological theory' describes the frequency-dependent behaviour of dielectric properties, such as dielectric constant ($\varepsilon$) and dielectric loss ($\varepsilon''$), in materials. The theory postulates that charge carriers, including electrons and holes, contribute to the polarization of the material. At lower frequencies, charge carriers align more easily with the electric field, leading to higher dielectric constants. As the frequency increases, charge carriers cannot keep up with the oscillating field, resulting in decreased dielectric constant and increased dielectric loss. Electrical conduction is attributed to the hopping mechanism, where electrons and holes move between localized sites. This theory explains the observed frequency dependence of dielectric properties and conductivity in materials.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%. The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopes of iron include $^{54}Fe$, $^{56}Fe$, $^{57}Fe$, and $^{58}Fe$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of the present disclosure are directed toward g-$C_3N_4$@$Fe_2O_3$/$MgAl_2O_4$ nanocomposites, which have been synthesized using simple methods. As used herein, the term 'g-$C_3N_4$@$Fe_2O_3$/$MgAl_2O_4$ nanocomposite' refers to a composite material including graphitic carbon nitride (g-$C_3N_4$) functionalized with iron(III) oxide ($Fe_2O_3$) and magnesium aluminate ($MgAl_2O_4$). These nanocomposites are relevant for electrical and dielectric applications, particularly in energy storage systems. The electrical conductivity of the sample increases with frequency, indicating semiconducting behaviour. The variation of dielectric constant ($\varepsilon$), dielectric loss ($\varepsilon''$), and AC conductivity with frequency has been investigated. Both the dielectric constant ($\varepsilon$) and dielectric loss ($\varepsilon$) decrease as frequency increases, while AC conductivity rises. The frequency dependence of $\varepsilon'$ and $\varepsilon$ is explained using Knop's phenomenological theory, and the electrical conduction mechanism is attributed to the hopping of electrons and holes.

A nanocomposite may include graphitic $C_3N_4$, $Fe_2O_3$, and $MgAl_2O_4$. The mass relationship of graphitic $C_3N_4$, $Fe_2O_3$, and $MgAl_2O_4$ in the nanocomposite is in a range of from 5 to 15:2 to 7:75 to 95, preferably 6 to 10:3 to 6:80 to 90, preferably 9 to 11:4 to 6:84 to 86, and more preferably 10:5:85, while tolerable variations of any of these values may be 2.5, 2, 1.5, 1, 0.75, 0.5, 0.25, 0.1, 0.5, or 0.1.

The nanocomposite contains g-$C_3N_4$ in an amount ranging from 5 to 15 wt. %, including 5 to 7 wt. %, 7 to 9 wt. %, 9 to 11 wt. %, 11 to 13 wt. %, and 13 to 15 wt. % based on the total weight of the nanocomposite. The nanocomposite may contain 10±2.5, 2, 1.5, 1, 0.75, 0.5, 0.25, 0.1, 0.5, or 0.1 wt. % of graphite-phase carbon nitride (g-$C_3N_4$). Graphitic $C_3N_4$ may include carbon nitride sheets that exhibit long-range two-dimensional crystalline order. The graphitic $C_3N_4$ may have no more than 10, 7.5, 5, 4, 3, 2, 1, 0.5, 0.1, 0.01, 0.001, 0.0001, or 0.00001%, based on its total volume, of a honeycomb structure.

The nanocomposite may contain $Fe_2O_3$ in an amount ranging from 2 to 7 wt. %, including 3 to 7 wt. %, 7 to 11 wt. %, 11 to 13 wt. %, 13 to 15 wt. %, and 15 to 17 wt. % based on the total weight of the nanocomposite. The nanocomposite may contain 5±1.5, 1, 0.75, 0.5, 0.25, 0.1, 0.5, or 0.1 wt. % of $Fe_2O_3$.

The nanocomposite may contain magnesium aluminium oxide ($MgAl_2O_4$) in an amount ranging from 75 to 95 wt. %, including 80 to 82 wt. %, 82 to 84 wt. %, 84 to 86 wt. %, 86 to 88 wt. %, and 88 to 90 wt. % based on the total weight of the nanocomposite. The nanocomposite may contain 85±5, 4, 3, 2.5, 2, 1.5, 1, 0.75, 0.5, 0.25, 0.2, or 0.1 wt. % of magnesium aluminium oxide ($MgAl_2O_4$).

The nanocomposite may be porous. A porous material is the one that forms a porous bulk solid. Pores may be micropores, mesopores, macropores, and/or a combination thereof. The pores exist in the bulk material, not necessarily in the molecular structure of the material. The term 'microporous' means that nanocomposite have pores with an average pore width (i.e. diameter) of less than 2 nm, e.g., in a range with an upper limit of 2, 1, 0.9, 0.75, 0.5, 0.25, 0.1, 0.05, or 0.01 nm, and/or a lower limit of 0.00001, 0.0001, 0.001, 0.01, 0.1, 0.25, 0.5, 0.75, or 1 nm. The term 'mesoporous' means the pores of the nanocomposite have an average pore width of 2 to 50 nm, though this may include subranges within this general range, e.g., a minimum diameter of 2, 3, 5, 10, 15, 20, 25, or 35 m, and/or a maximum diameter of 50, 45, 40, 35, 30, 25, 20, 15, or 10 nm. The term 'macroporous' means the pores of nanocomposite have an average pore width larger than 50 nm, e.g., at least 55, 75, 100, 250, 500, 750, or 1000 nm. Pore size may be determined by methods including, but not limited to, gas adsorption (e.g. $N_2$ adsorption), mercury intrusion porosimetry, and imaging techniques such as scanning electron microscopy (SEM), and X-ray computed tomography (XRCT).

A Brunauer-Emmett-Teller (BET) specific surface area of the nanocomposite may be in a range of from 15 to 45 square meters per gram ($m^2/g$), preferably 16 to 44 $m^2/g$, preferably 17 to 43 $m^2/g$, preferably 18 to 42 $m^2/g$, preferably 19 to 41 $m^2/g$, preferably 20 to 40 $m^2/g$, preferably 21 to 39 $m^2/g$, preferably 22 to 38 $m^2/g$, preferably 23 to 37 $m^2/g$, preferably 24 to 36 $m^2/g$, preferably 25 to 35 $m^2/g$, preferably 26 to 34 $m^2/g$, preferably 27 to 33 $m^2/g$, preferably 28 to 32 $m^2/g$, and preferably 29 to 31 $m^2/g$. The surface area of the nanocomposite may be 23.88±5, 4, 3, 2.5, 2, 1.5, 1, 0.75, 0.5, 0.25, 0.2, or 0.1 $m^2/g$. The BET hypothesis is the foundation for a significant analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. In some embodiments, pore diameter, pore volume, and BET surface area are measured by gas adsorption analysis, preferably $N_2$ adsorption analysis (e.g., $N_2$ adsorption isotherms).

A first average pore diameter of the first mode of the nanocomposite, according to Barrett-Joyner-Halenda (BJH) measurement method, may be in a range of from 6.3 to 10.03 nm, preferably 6.5 to 9.8 nm, preferably 6.7 to 9.6 nm, preferably 6.9 to 9.4 nm, preferably 7.1 to 9.2 nm, preferably 7.3 to 9.0 nm, preferably 7.5 to 8.8 nm, preferably 7.7 to 8.6 nm, preferably 7.9 to 8.4 nm, and preferably 8.1 to 8.2 nm. A second average pore diameter of the second mode of the nanocomposite, according to BJH measurement method, may be in a range of from 7.5 to 13 nm, preferably 8.0 to 12.5 nm, preferably 8.5 to 12.0 nm, preferably 9.0 to 11.5 nm, preferably 9.5 to 11.0 nm, and preferably 10.0 to 10.5 nm. The first average pore diameter of the first mode of the nanocomposite, according to BJH measurement method, may be 8.3±1.5, 1, 0.75, 0.67, 0.5, 0.33, 0.25, 0.125, 0.1, 0.05, or 0.01 nm, with a second average pore diameter of the second mode of the nanocomposite, according to BJH measurement method, may be 10.87±2.5, 2, 1.5, 1, 0.75, 0.67, 0.5, 0.33, 0.25, 0.125, 0.1, 0.05, or 0.01 nm.

An average pore volume of the nanocomposite, according to the BJH measurement method, may be in a range of from 0.06 to 0.12 $cm^3/g$, preferably 0.07 to 0.11 $cm^3/g$, preferably 0.08 to 0.10 $cm^3/g$, and preferably 0.09 $cm^3/g$. The average pore volume of the nanocomposite, according to the BJH measurement method, may be 0.09±0.025, 0.01, 0.005, or 0.001 $cm^3/g$.

An average pore distribution of the nanocomposite may include, but is not limited to, crystalline average pore distribution, bimodal, trimodal, multimodal, narrow, broad and Gaussian. The average pore distribution of the nanocomposite may be bimodal. This bimodal pore structure suggests that the nanocomposite contains both smaller and larger pores, which may contribute to enhanced properties such as improved surface area, increased mechanical strength, or enhanced porosity for specific applications.

The nanocomposite may have a (311) spinel interplanar spacing in a range of from 0.210 to 0.290 nm, preferably 0.220 to 0.280 nm, preferably 0.230 to 0.270 nm, and preferably 0.240 to 0.260 nm, according to selected area diffraction (SAED). The nanocomposite may have a (006) $Fe_2O_3$ interplanar spacing in a range of from 0.180 to 0.260 nm, preferably 0.190 to 0.250 nm, preferably 0.200 to 0.240 nm, and preferably 0.210 to 0.230 nm, according to SAED. The nanocomposite may have a (400) spinel interplanar spacing in a range of from 0.140 to 0.220 nm, preferably 0.150 to 0.210 nm, preferably 0.160 to 0.200 nm, preferably 0.170 to 0.190 nm, according to SAED. The nanocomposite may have a (220) MgO interplanar spacing in a range of from 0.108 to 0.188 nm, preferably 0.118 to 0.178 nm, preferably 0.128 to 0.168 nm, and preferably 0.138 to 0.158 nm, according to SAED. The nanocomposite may have a (620) spinel interplanar spacing in a range of from 0.090 to 0.170, preferably 0.100 to 0.160 nm, preferably 0.110 to 0.150 nm, preferably 0.120 to 0.140 nm, according to SAED. The nanocomposite may have a (119) $Fe_2O_3$ and (622) $Fe_2O_3$ spinel interplanar spacing in a range of from 0.080 to 0.160, preferably 0.090 to 0.150 nm, preferably 0.100 to 0.140 nm, preferably 0.110 to 0.130 nm, according to SAED.

The nanocomposite may have a (311) spinel interplanar spacing of 0.25 nm, a (006) $Fe_2O_3$ interplanar spacing of 0.22 nm, a (400) spinel interplanar spacing of 0.18 nm, a (220) MgO interplanar spacing of 0.148 nm, a (620) spinel interplanar spacing of 0.13 nm, and/or a (119) $Fe_2O_3$ and (622) $Fe_2O_3$ spinel interplanar spacing of 0.12 nm, according to SAED.

The mass relationship of the nanocomposite may be in a range of from 9 to 11:4 to 6:84 to 86, preferably 10:5:85. The nanocomposite may have a (311) spinel interplanar spacing of 0.25±2% nm, a (006) $Fe_2O_3$ interplanar spacing of 0.22±2% nm, a (400) spinel interplanar spacing of 0.18±2% nm, a (220) MgO interplanar spacing of 0.148±2% nm, a (620) spinel interplanar spacing of 0.13±2% nm, and/or a (119) $Fe_2O_3$ and (622) $Fe_2O_3$ spinel interplanar spacing of 0.12±2% nm.

An XRD spectrum of the nanocomposite under Cu-filtered Cu Kα radiation (1.5418 Å) powered at 45 kilovolts (kV) and 10 milliampere (mA) may have 20 peaks of a $MgAl_2O_4$ spinel phase at 18.9±1, 31.7±1, 44.8±1, 56.2±1, 74.09±1, and/or 78.1±1°, a MgO cubic phase at 42.8±1, 62.2±1, and/or 74.6±1°, a $Fe_2O_3$ hexagonal phase at 36.9±1, 44.8±1, 59.6±1, and/or 67.3±1°, and/or g-$C_3N_4$-related diffractions at 27.8±1, 36.8±1, 44.6±1, and/or 67.3±1°. In some embodiments, no more than 1%, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % relative intensity $MgFe_2O_4$ (none) is detected in the XRD spectrum. The minimal presence of $MgFe_2O_4$ (no more than 1, 0.5, 0.1, 0.01, 0.001, 0.0001, or 0.00001% relative intensity or none) in the nanocomposite may be critical to maintaining its enhanced catalytic properties, high surface reactivity, and efficient adsorption. This may ensure desired performance in environmental remediation, energy production, and biomedical applications, free from interference by less reactive $MgFe_2O_4$ phases.

The $Fe_2O_3$ in the nanocomposite may have a hexagonal crystal structure. Alternatively or additionally, the $Fe_2O_3$ may exist in other crystal phases, including cubic, monoclinic, tetragonal, rhombohedral, and orthorhombic phases. The MgO may have a cubic phase. The MgO may also or alternatively exist in other crystal phases, including hexagonal, monoclinic, tetragonal, rhombohedral, and orthorhombic phases.

The $MgAl_2O_4$ may have a spinel phase. The spinel phase is a mixed oxide with the general formula $AB_2O_4$, including one divalent cation ($A^{2+}$) and two trivalent cations ($B^{3+}$). The unit cell consists of a face-centered cubic arrangement of oxygen ions, containing 32 $O^{2-}$ ions, with 64 tetrahedral and 32 octahedral sites occupied by $A^{2+}$ and $B^{3+}$ cations. When one half of the octahedral interstices are occupied by $B^{3+}$ cations and one-eighth of the tetrahedral sites are occupied by $A^{2+}$ cations, the spinel phase is termed 'normal'. Conversely, when tetrahedral sites are occupied by half of the $B^{3+}$ and octahedral sites by the other half along with $A^{2+}$, the spinel phase is termed 'inverse'.

$MgAl_2O_4$ has been widely used in various applications, such as in metallurgical, electrochemical, radio-technical, and chemical industrial fields owing to its high thermal stability (melting point at 2135 degrees Celsius (° C.), high hardness (16 gigapascal (GPa)), high mechanical resistance, high resistance against chemical attack, wide band gap energy, high electrical resistivity, relatively low thermal expansion coefficient ($9.10^{-6}$ 1/° C.) between 3° and 1400° C., low dielectric constant, low density (3.58 gram per cubic centimeter ($g/cm^3$)), high thermal shock resistance, hydrophobicity, and low surface acidity.

The nanocomposite may include no more than 1 wt. %, preferably less than 0.9 wt. %, preferably less than 0.8 wt. %, preferably less than 0.7 wt. % g, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, and preferably less than 0.01 wt. % of carbonaceous material besides the graphitic carbon nitride. A low concentration of carbonaceous material contributes to maintaining the desired structural integrity and functional properties of the nanocomposite. The minimal amount of additional carbon material may prevent any significant interference with the performance of the graphitic carbon nitride, particularly in applications such as photocatalysis or energy storage, where the purity and specific properties of the $g-C_3N_4$ are crucial. The carbon materials in the nanocomposite may include no more than 0.01 wt. % (inevitable traces) nanotubes, relative to total nanocomposite weight.

The nanocomposite may include no more than 1, 0.5, 0.1, 0.01, 0.001, 0.0001, or 0.00001 wt. % of sulfides, relative to the total nanocomposite weight. The nanocomposite includes no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. % elemental state metal, relative to total nanocomposite weight.

The nanocomposite includes no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. % Fe, relative to total nanocomposite weight.

The nanocomposite includes less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. % Bi, relative to total nanocomposite weight.

The nanocomposite includes no more than 5 at. % Fe(III) ions, preferably less than 4 at. % Fe(III) ions, preferably less than 3 at. % Fe(III) ions, preferably less than 2 at. % Fe(III) ions, preferably less than 1, 0.5, 0.1, 0.01, 0.001, 0.0001, or 0.00001 at. % Fe(III) ions, relative to the total iron atoms in the nanocomposite.

The nanocomposite includes no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. % $MnO_2$, relative to total nanocomposite weight.

The nanocomposite includes no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, individually, of $SrTiO_3$, Au, $SnO_2$, and/or SnO, relative to total nanocomposite weight.

In some embodiments, nanocomposite includes no more than 10 wt. % MgO, preferably less than 9 wt. % of MgO, preferably less than 8 wt. % of MgO, preferably less than 7 wt. % of MgO, preferably less than 6 wt. % of MgO, preferably less than 5 wt. % of MgO, preferably less than 4 wt. % of MgO, preferably less than 3 wt. % of MgO, preferably less than 2 wt. % of MgO, and preferably less than 1, 0.5, 0.1, 0.01, 0.001, 0.0001, or 0.00001 wt. % MgO, relative to the total metal oxide weight.

The nanocomposite includes no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. % $ZrO_2$, relative to the total metal oxide weight.

The nanocomposite includes no more than 10 wt. %, preferably less than 9 wt. %, preferably less than 8 wt. %, preferably less than 7 wt. %, preferably less than 6 wt. %, preferably less than 5 wt. %, preferably less than 4 wt. %, preferably less than 3 wt. %, preferably less than 2 wt. %, preferably less than 1, 0.5, 0.1, 0.01, 0.001, 0.0001, or 0.00001 wt. %, individually or in any combination, of ZnO, $Fe_3O_4$, $CeFeO_3$, $GdFeO_3$, $LaFeO_3$, $BaTiO_3$, $CaTiO_3$, $SrTiO_3$, $CaZrO_3$, $PbTiO_3$, $Mg_{1-x}Ni_xFe_2O_4$ (x=0.0, 0.6, 1.0), Ag, $CoFe_2O_4$, $CuFe_2O_4$, $MnFe_2O_4$, $NiFe_2O_4$, $ZnFe_2O_4$, $Cu_{i-x}Cd_xFe_2O_4$, $Zn_{0.7}Ni_{0.15}Cu_{0.15}Fe_2O_4$, $Zn_{0.3}Ni_{0.7-x}Co_xFe_2O_4$ ($0 \leq x \leq 0.7$), $Mn_{0.1}Mg_{0.2}(Co, Ni, Zn)_{0.7}Fe_2O_4$, $LaCo_{0.5}Fe_{0.5}O_3$, $Mg_{0.1}$—$Co_{0.9}Fe_2O_4$, $La_{1-x}Gd_xCr_{1-y}Ni_yO_3$, $Gd_2FeCrO_6$, $KTaO_3$, $NaTaO_3$, $NaNbO_3$, $KNbO_3$, $Mg_{1-x}Ni_xFe_2O_4$, $Cu_{0.5}Cd_{0.25}Co_{0.25}Fe_{2-x}O_4$, $Zn_{0.5}Co_{0.5}La_xFe_{2-x}O_4$, $Pr_2Ti_2O_7$, $SiO_2$, $TiO_2$, $ZnO$, $ZnS$, $Bi_4O_5I_2$, $SrFe_{0.5}Ta_{0.5}O_3$, $La_{0.5}Ba_{0.2}TiO_{3.5-\delta}$, $LaTiO_{3.5-\delta}$, $NaNbO_3$, and/or $LaFeO_3$.

The nanocomposite comprises no more than 1, 0.5, 0.1, 0.01, 0.001, 0.0001, or 0.00001 wt. %, individually or in any combination, relative to total metal content, of any or all of Au, Zn, Ce, Gd, La, Ba, Ti, Ca, Sr, Zr, Pb, Ni, Ag, Co, Cu, Mn, Cd, Ta, Nb, Pr, and/or Bi, individually or together, and the nanocomposite comprises no more than 1, 0.5, 0.1, 0.01, 0.001, 0.0001, or 0.00001 wt. %, individually or in any combination, relative to total carrier weight, of $SiO_2$, $TiO_2$, $ZnO$, and/or $ZnS$.

The nanocomposite comprises no more than inevitable traces of a mercaptan, amine, and/or carboxylic acid functional groups, e.g., no detectable amount or, for example, less that 1, 0.5, 0.1, 0.01, 0.001, 0.0001, or 0.00001 mercaptan, amine, and/or carboxylic acid functional group equivalents per mg of the nanocomposite. The nanocomposite includes no more than inevitable traces of C—N heterocycles (esp., pyridine), and inevitable traces of silyl functions, e.g., no detectable amount or, for example, less that 1, 0.5, 0.1, 0.01, 0.001, 0.0001, or 0.00001 silyl equivalents per mg of the nanocomposite. Alternatively, "inevitable traces" may refer to less than 0.1, 0.01, 0.001, 0.0001, or 0.00001 wt. %, relative to total nanocomposite weight, depending upon the suitable method of detection.

The minimal presence or absence of each of these elements/compounds, in aforementioned embodiments, in the nanocomposite ensures desired performance in environmental remediation, energy production, and biomedical applications, free from interference by other phases in the nanocomposite.

In some embodiments, a method of storing electrical charge is described. The method includes charging a capacitor, including an anode and/or a cathode layer including the nanocomposite, with alternating current at a frequency in a range of from 1 to 15 megahertz (MHz), preferably 2 to 13 MHz, preferably 3 to 13 MHz, preferably 4 to 13 MHz, and yet more preferably 5 to 13 MHz. The anode and/or a cathode layer including the nanocomposite, in operation, becomes an electric double-layer of conductor-rich grains separated by conductor-poor grain boundaries. This configuration may enhance charge storage efficiency. The anode and/or a cathode layer including the nanocomposite forms an array of homogeneous spherical metal oxides nanoparticles having an average largest diameter in a range of from 5.5 to 8.5 nm, preferably 6 to 8 nm, preferably 6.5 to 7.5 nm, preferably 6.8 to 7.2 nm, and yet more preferably 7 nm on a porous structured layer including curled and/or wrinkled nanosheets and platelets of the g-$C_3N_4$, enhancing the capacitive performance and enhancing the charge storage capacity of the capacitor. The purpose of forming spherical metal oxide nanoparticles in the anode and/or cathode layer of the nanocomposite is to enhance the capacitive performance and increase the charge storage capacity of the capacitor. The spherical shape of the nanoparticles enhances the material's surface area and facilitates efficient charge distribution and storage.

EXAMPLES

The following examples demonstrate a method of storing electrical charge via a nanocomposite. The examples are provided solely for illustration and are not to be construed as limitations of the present disclosure, as many variations thereof are possible without departing from the spirit and scope of the present disclosure.

Example 1: Fabrication of g-$C_3N_4$@$Fe_2O_3$/$MgAl_2O_4$(10:5:85, Wt. %) Nanocomposite According to the present disclosure, magnesium nitrate, and aluminum nitrate were added together in one beaker with ammonium metavanadate, in a predetermined amount (here, stoichiometric), to produce a 10% $Fe_2O_3$@$MgAl_2O_4$ nanocomposite. Further, about 10 grams (g) of methanol, as a fuel, was added to the beaker, followed by 30 milliliters (mL) of distilled water. The beaker was heated till a clear solution was obtained, and heated further till dryness. The obtained product was ground in a mortar, transferred to a 150 mL porcelain dish, and calcined at 700° C. for 3.0 hours. Furthermore, the 10% $Fe_2O_3$@$MgAl_2O_4$ product was cooled down to room temperature and weighed, ground with urea in an amount suitable (here, 2 g urea to 20 g of the 10% $Fe_2O_3$/$MgAl_2O_4$ product, but depending upon the reaction conditions, this may be 5, 10, 15, 20, 25, 33, 50, 100, 150, 250, 500, or 1000 parts by weight of urea to 100 parts by weight of 10% $Fe_2O_3$/$MgAl_2O_4$, and optionally no more than 100,000, 50,000, 25,000, 10,000, 5,000, 1,000, 750, 500, 400, 333, 250, 125, 100, 75, 50, or 25 parts by weight urea to 100 parts) to produce g-$C_3N_4$@$Fe_2O_3$/$MgAl_2O_4$ (10:5:85, wt. %) nanocomposite. The quadruple mixture was returned and heated to 600° C. for 60 minutes in a covered porcelain crucible, and subsequently, the g-$C_3N_4$@$Fe_2O_3$/$MgAl_2O_4$ (10:5:85, wt. %) nanocomposite was collected.

Example 2: Characterization

X-ray diffraction (XRD) was used to identify the crystalline states in each specimen, employing the JDX-8030 X-ray, JEOL, made in Japan. Cu-filtered Cu-Kα radiation (1.5418 Å) powered at 45 kV and 10 mA was used to run the patterns. The specimens were tested at ambient temperatures in a range of 2θ=5° to 80°. The surface morphologies of the obtained samples were analyzed using images of transmission electron microscopy (TEM), selected area electron diffraction (SAED), and high-resolution transmission electron microscopy (HRTEM), obtained by a Tecnai-G20 (USA) transmission electron microscope with a 200 kV speed voltage.

Example 3: Electrical Measurements

In certain aspects of the present disclosure, a two-probe method to measure an electrical conductivity (EC) of tablets having a diameter of about 10 millimeters (mm) and a thickness of about 1 mm. The tablets were manufactured by pressing powder under a $2 \times 10^{-3}$ kg/cm² pressure. Silver paste was placed on both surfaces of each tablet. The tablets were placed in an oven to remove any moisture. The electrical conductivity, dielectric constant, dielectric loss, and impedance were measured, under typical room conditions, using a programmable automatic LCR bridge (model HIOKI IM 3536, Nagano, Japan) at a fixed voltage of about 1.0 V and frequencies between 1000 Hz and 2 MHz. The frequency dependent complex dielectric function may be expressed via Equation 1, as provided hereinafter:

$$\varepsilon^{**}(\omega) = \varepsilon'(\psi) - j\varepsilon''(\omega) \tag{1}$$

where, $j' = \sqrt{-1}$, the imaginary part of the permittivity is represented by $\varepsilon''$, while the real part is represented by $\varepsilon'$.

Further, equation 2 and equation 3 were used to approximate the values for $\varepsilon'$ and $\varepsilon''$, as provided below:

$$\varepsilon' = Cd/\varepsilon^\circ As \quad (2)$$

$$\varepsilon''(\omega) = \varepsilon'(\omega)\tan \delta \quad (3)$$

where '$\varepsilon^\circ$' is the free space permittivity about and is equal to $8.86 \times 10^{-12}$ F/m, 'd' is the thickness, 'As' is the cross-section area, 'Tan $\delta$' is the dissipative factor, '$\omega$' ($2\pi f$) is the electric field frequency.

Results and Discussion

Figure 1:
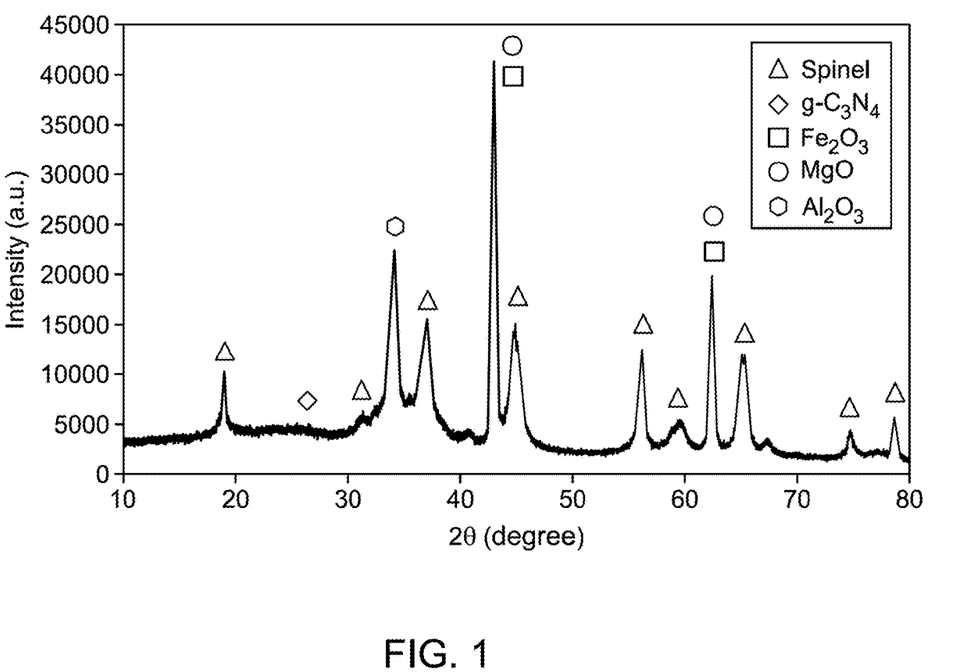
FIG. 1 is a graph depicting X-ray diffraction (XRD) patterns of an inventive 10% g-$C_3N_4$@$Fe_2O_3$/$MgAl_2O_4$ nanocomposite.

As mentioned above, XRD was used to examine the crystallinity and phase identification of the g-$C_3N_4$@$Fe_2O_3$/MgAl$_2$O$_4$ catalyst, the results are depicted in FIG. 1. The high crystalline nature of the nanocomposite was indicated by strong peaks, as shown in FIG. 1. The phases of $Fe_2O_3$, MgO, MgAl$_2$O$_4$, and g-$C_3N_4$ were identified by analyzing the diffraction patterns in comparison with the normal JCPDS cards. MgAl$_2$O$_4$ spinel diffractions were recorded at 2.6 values of 18.9°, 31.7°, 44.8°, 56.2°, 74.09°, and 78.1°. The standard COD card number 9001364 states that these diffractions originated from the (111), (220), (400), (422), (620), and (622) planes, respectively. MgO (COD card, No. 9000499) showed a cubic phase at 20 values of 42.8°, 62.2°, and 74.6°. The (200), (220), and (311), respectively, are represented by these lines. It has also been previously observed that MgO is present along with the MgAl$_2$O$_4$ spinel phase. The hexagonal phase of $Fe_2O_3$ (COD No. 1532120) is closely matched with the diffraction lines seen at 36.9°, 44.8°, 59.6°, and 67.3°. The peak at 34.2° relates to Al$_2$O$_3$. Further, g-$C_3N_4$-related diffractions were detected at 27.8°, 36.8°, 44.6°, and 67.3° (COD No. 1534042). Furthermore, g-$C_3N_4$@$Fe_2O_3$/MgAl$_2$O$_4$ was fabricated since no additional phase, such as MgFe$_2$O$_4$, were found. However, the computed lattice parameters for each phase were also determined and were as follows; for spinel 'a' was about 8.07410 Å, for $Fe_2O_3$ 'a' was about 4.83840 Å and 'c' was about 12.61127 Å, for MgO 'a' was about 4.20729 Å, and for g-$C_3N_4$ 'a' was about 6.84283 Å.

Figure 2A:
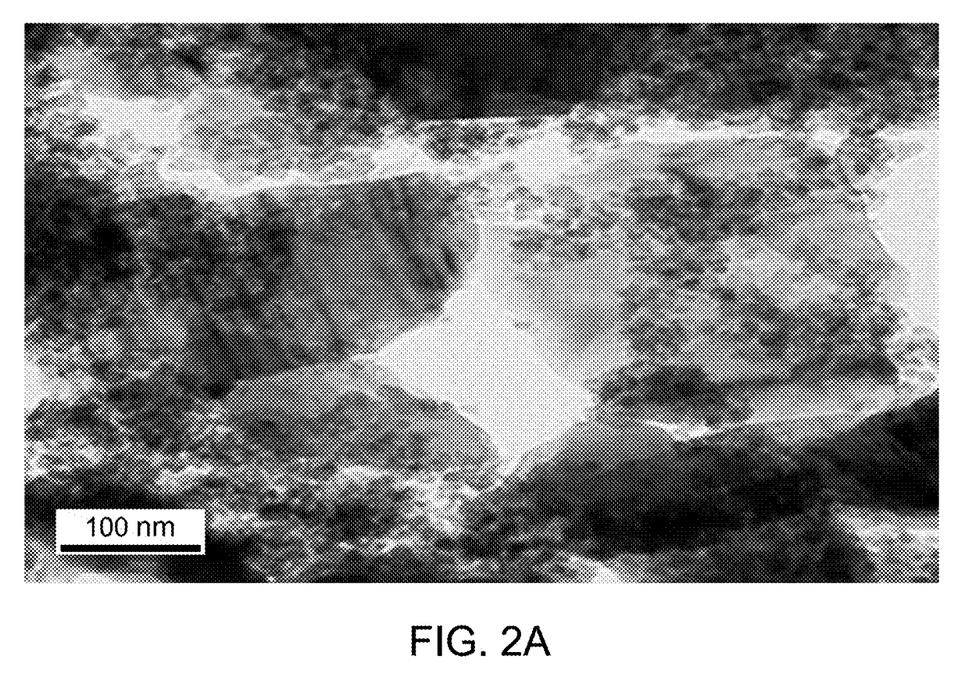
FIG. 2A is a transmission electron microscopy (TEM) image of an inventive 10% g-$C_3N_4$@$Fe_2O_3$/$MgAl_2O_4$ nanocomposite, at a magnification of 100 nanometers (nm).
Figure 2B:
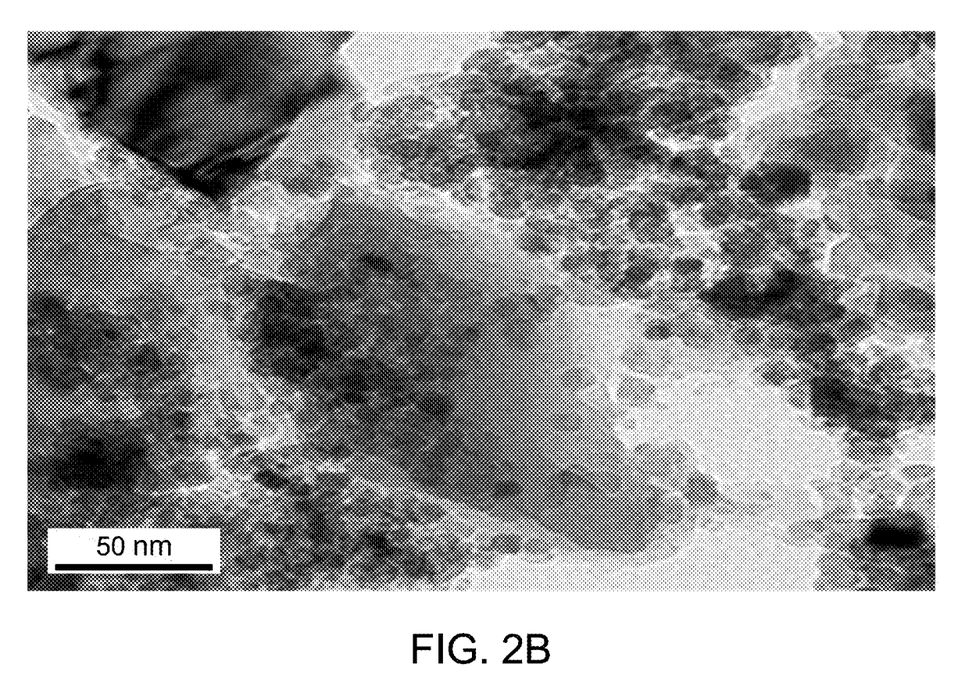
FIG. 2B is another TEM image of an inventive 10% g-$C_3N_4$@$Fe_2O_3$/$MgAl_2O_4$ nanocomposite, at a magnification of 50 nm.
Figure 2C:
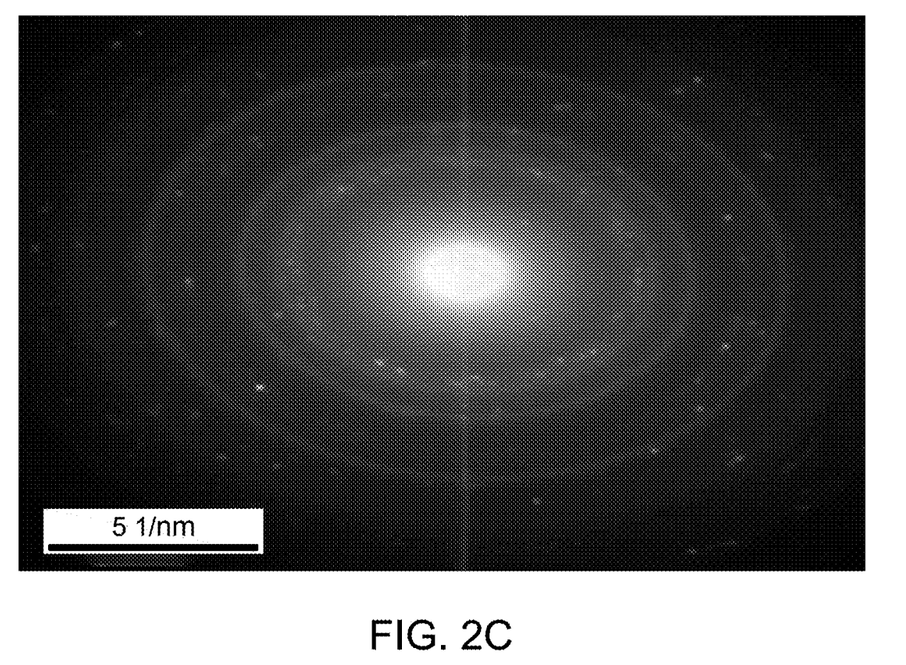
FIG. 2C is a selected area electron diffraction (SAED) pattern of an inventive 10% g-$C_3N_4$@$Fe_2O_3$/$MgAl_2O_4$ nanocomposite.
Figure 2D:
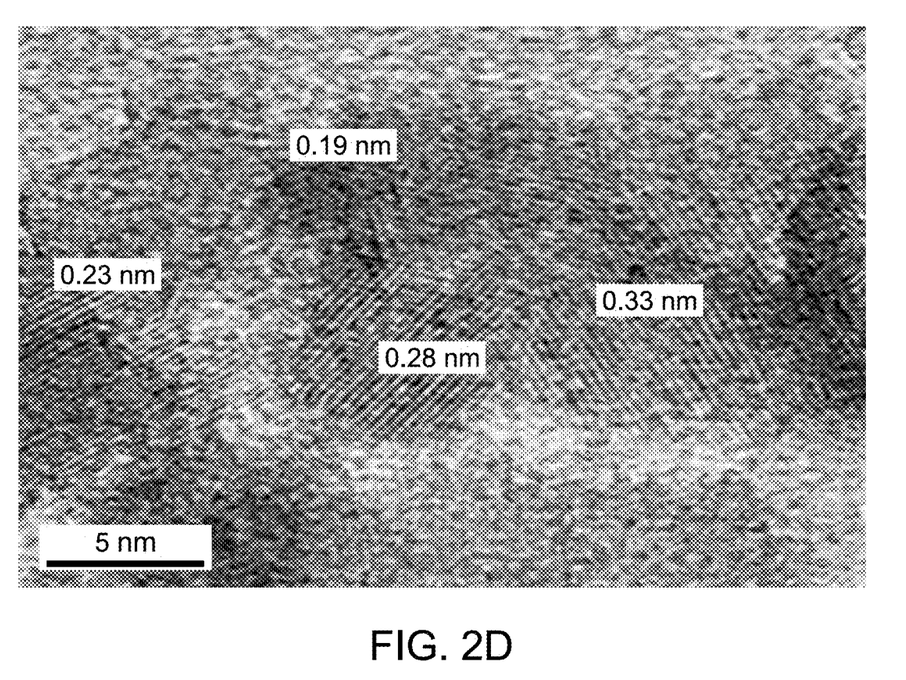
FIG. 2D is a high-resolution transmission electron microscopy (HRTEM) image of an inventive 10% g-$C_3N_4$@$Fe_2O_3$/$MgAl_2O_4$ nanocomposite.

Further, TEM images of g-$C_3N_4$@$Fe_2O_3$/MgAl$_2$O$_4$ nanocomposite are shown in FIGS. 2A-2B. The TEM images showed the well dispersion of homogeneous spherical metal oxides nanoparticles with a size of about 7.0 nm on two-dimensional porous structure constructed with curled and wrinkled nanosheets and platelets of the g-$C_3N_4$. The corresponding SAED pattern, as shown in FIG. 2C, reveals diffraction spots with interplanar spacing of 0.25, 0.22, 0.18, 0.148, 0.13 nm, and 0.12 nm due to (311, spinel), (006, $Fe_2O_3$), (400, spinel), (220, MgO), (620, spinel), and (119, $Fe_2O_3$; 622, spinel) diffraction planes. The corresponding HRTEM of the nanocomposite, as shown in FIG. 2D, shows a plane spacing of 0.33 nm related to the (002) of CN, where 0.28 nm and 0.19 nm related to (220), and (400) planes of spinel, and 0.24 nm related to (110) plane of $Fe_2O_3$, characterizing the heterostructure formation.

Figure 3:
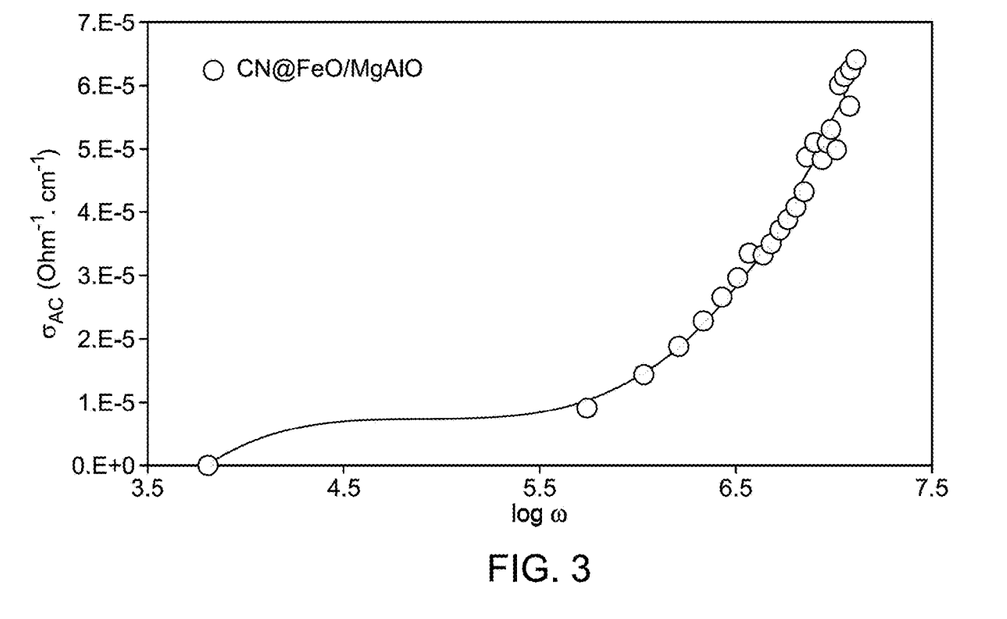
FIG. 3 is a graph depicting influence of frequency on the AC conductivity of an inventive 10% g-$C_3N_4$@$Fe_2O_3$/$MgAl_2O_4$ nanocomposite.

Further, in general, the AC method distinguishes between several mechanisms, such as electrode response, grain boundary conduction, and grain conduction, that contribute to an overall conductivity of a material. The AC conductivity frequency dependence for the g-$C_3N_4$@$Fe_2O_3$/MgAl$_2$O$_4$ nanocomposite, at room temperature, is shown in FIG. 3. Furthermore, equation 4 is utilized to determine the AC conductivity of every sample:

$$\sigma_{AC} = \varepsilon' \varepsilon^0 \omega \tan \delta \quad (4)$$

where '$\varepsilon^0$' is the vacuum permittivity, '$\varepsilon'$' is the dielectric constant, and 'tan $\delta$' depicts the loss tangent. As can be seen from FIG. 3, the AC conductivity increases with frequency, specifically at higher frequencies, since high frequency delivers a larger pumping power to charge carriers, subsequently, the AC conductivity is highest at higher frequencies, as described by Rao and colleagues. *J. Mater. Sci.* 1997, 32, 6049e54, which is incorporated by reference herein. An increase in the hopping rate of charge between the charge carriers is sufficient to improve conductivity without increasing the number of charge carriers.

According to present disclosure, the behavior of the nanocomposite as a multilayer capacitor of grains and grain boundaries, as predicted by the Koops model may be able to explain the increase in AC conductivity with temperature and frequency, as described by Sivakumar and coworkers in *J. Korean Ceram. Soc.* 2018, 55, 230e8. A practically continuous plateau area was seen at lower frequencies where the resistive grain boundaries were more active and prevent electronic charge carriers from hopping between such boundaries. However, the conductive grains were more active at higher frequencies, allowing charge carriers to hop between neighboring ions.

The release of charge carriers trapped in small areas may lead to a rise in high-frequency conductivity, an increase in the force of the applied field, and increased migration and movement of the released charge carriers in different directions. Significant elements in the conduction of material behavior include liberated charge carriers and electron mobility among many metal ions, as described by Ahmed and colleagues in *Mater. Lett.* 2003, 57, 4256-4266, which is incorporated by reference herein. Materials used in semiconductors have the following frequency-dependent relationship, as depicted by equation 5:

$$\sigma_{AC}(\omega) = A\omega^s \quad (5)$$

where 'A' and 's' are constants.

Figure 4:
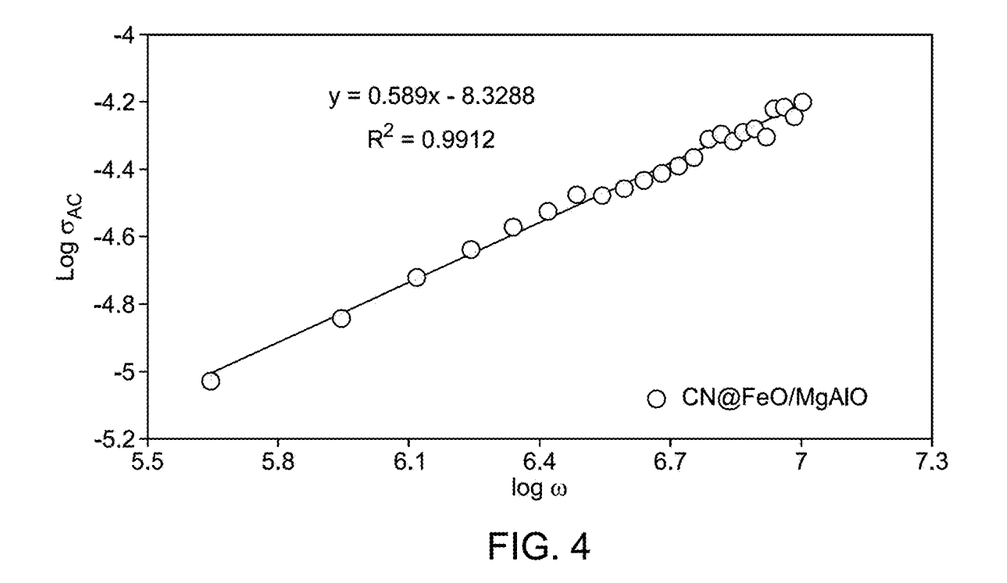
FIG. 4 is a graph depicting AC conductivity frequency dependence of an inventive 10% g-$C_3N_4$@$Fe_2O_3$/$MgAl_2O_4$ nanocomposite.

A sudden hopping of the charge carriers results in translational motion if 's' less than 1, while a localized hopping of the species is indicated when 's' is more than 1, as described by Sen and colleagues in *Mater. Chem. Phys.* 2004, 87, 256-263, which is incorporated by reference herein. The effect is caused by the relaxation resulting from the movement of electrons or atoms by tunneling or hopping between equilibrium locations. The exponent 's' is determined by graphing the natural logarithm of '$\sigma_{AC}(\omega)$' against the natural logarithm of '$(\omega)$', as depicted in FIG. 4. The value of 's' was found to be around 0.589, indicating that correlated barrier hopping (CBH) is the most likely mechanism in the g-$C_3N_4$@$Fe_2O_3$/MgAl$_2$O$_4$ nanocomposite. In general, the relation between the conduction mechanism and 's(f)' behavior may suggest a suitable model of the conduction mechanism.

Figure 5:
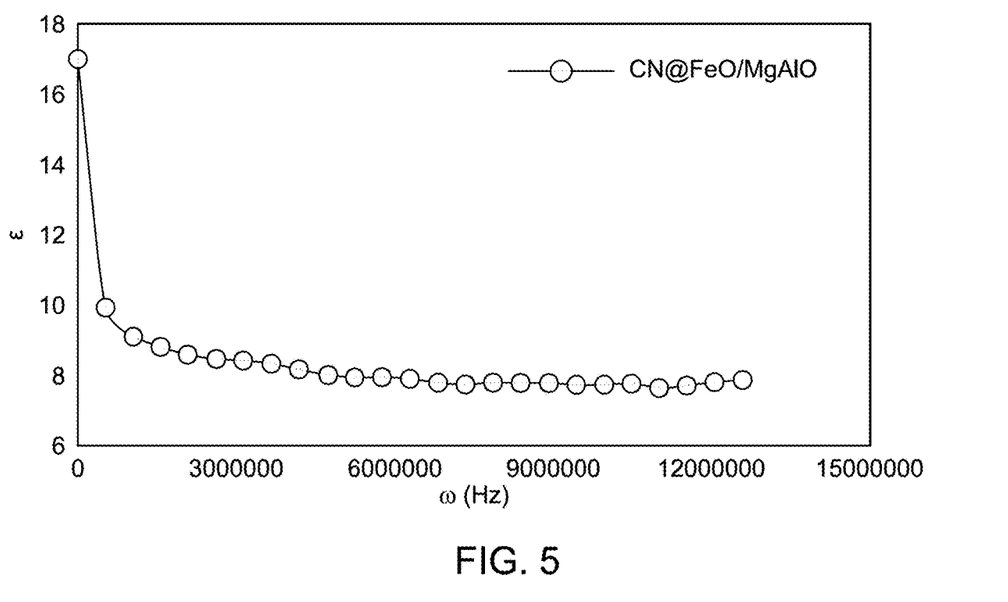
FIG. 5 is a graph depicting the frequency dependence of dielectric constant of an inventive 10% g-$C_3N_4$@$Fe_2O_3$/$MgAl_2O_4$ nanocomposite.

The frequency dependence of the '$\varepsilon''$' for the g-$C_3N_4$@$Fe_2O_3$/MgAl$_2$O$_4$ nanocomposite at room temperature, is depicted in FIG. 5. In particular, FIG. 5 shows a dispersion in $\varepsilon'$ values as the frequency increases. At lower frequencies, the decline in $\varepsilon'$ value occurs rapidly, whereas at higher frequencies, approaching a constant value takes longer. In general, charge polarization is the storage of some energy in a substance when it is exposed to an external electric field. The stored energy is represented by the real component ($\varepsilon'$) of the dielectric constant. As mentioned above, FIG. 5 illustrates the effect of frequency on the dielectric constant $\varepsilon'$ of the examined materials at specific temperatures. The graph, as depicted in FIG. 5, indicates that for the nanocomposite, $\varepsilon'$ drops with increasing frequency. At lower frequencies, the decline was swift, while at higher frequencies, the decline was more gradual. The observed dielectric behavior may be explained by the hopping process and the idea of polarization, as described by Kambale and colleagues in *Smart Mater. Struct.* 2009, 18, 085014, which is incorporated by reference herein.

The nanocomposite was presumed to be arranged of distinctive structures or regions (grain and grain boundaries) and the conductivity of the grain was higher than the grain boundary. Therefore, it is appropriate to say that the higher dielectric constant values were obtained from the charge accumulation at the grain boundaries.

In general, according to the Koops theory, the interfacial polarization of the Maxwell-Wagner type may be used to analyze the dielectric dispersion curves, as described by Melagiriyappa in *Mater. Chem. Phys.* 2008, 112, 68e73, which is incorporated by reference herein. Dielectric behavior and ac electrical conductivity study of $Sm^{3+}$ substituted Mg—Zn ferrites, which is incorporated by reference herein. The aforementioned models predict that the nanocomposite includes conductor rich grains separated by conductor-poor grain boundaries. The grain boundaries are more effective at low frequencies, whereas grains are more effective at higher frequencies.

Figure 6:
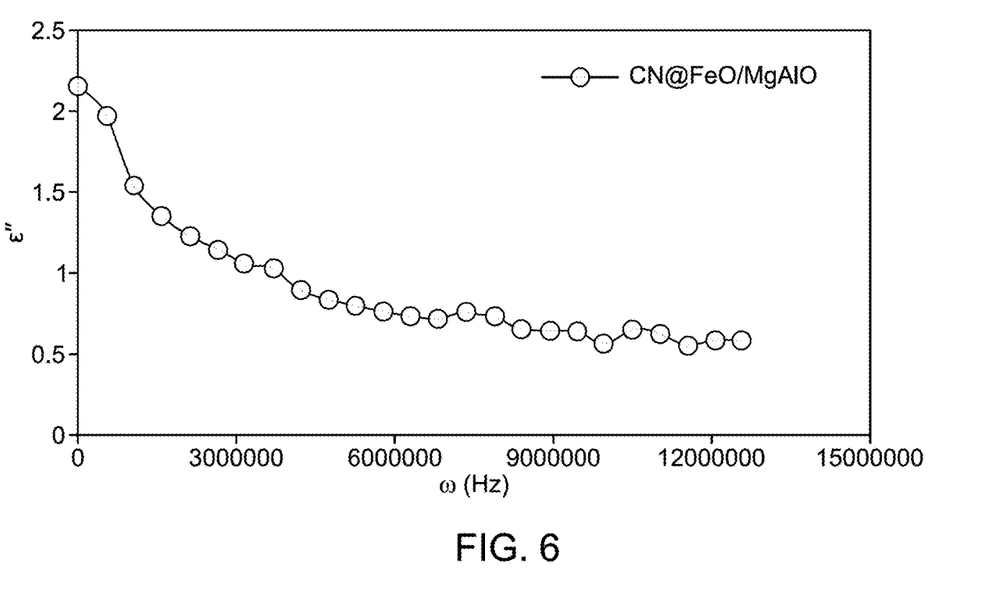
FIG. 6 is a graph depicting the frequency-dielectric loss ($\varepsilon''$) correlation of an inventive 10% g-$C_3N_4$@$Fe_2O_3$/$MgAl_2O_4$ nanocomposite.

Further, the dielectric loss factor ($\varepsilon''$) specifies the quantity of energy lost due to charge carrier movement. The fluctuation of $\varepsilon''$ as a function of frequency for g-$C_3N_4$@$Fe_2O_3$/$MgAl_2O_4$ nanocomposite at room temperature is shown in FIG. 6. The behavior obtained is comparable to that of the real part of the dielectric constant, as such, it decreases as the frequency increases. The $\varepsilon''$ value rapidly drops in the low-frequency region while remaining low in the high-frequency region. The observed trend may be elucidated by the fact that in the low-frequency region where the samples possess higher resistivity (because of the grain boundary), additional energy is needed to hop the charges between the cations, and thus, the loss is high. In the high-frequency region, where the samples have low resistivity (due to grains), less energy is involved in hopping the charges between the cations at the octahedral sites. The polarization of space charges may potentially cause a decrease in dielectric loss as the frequency increases.

Figure 7:
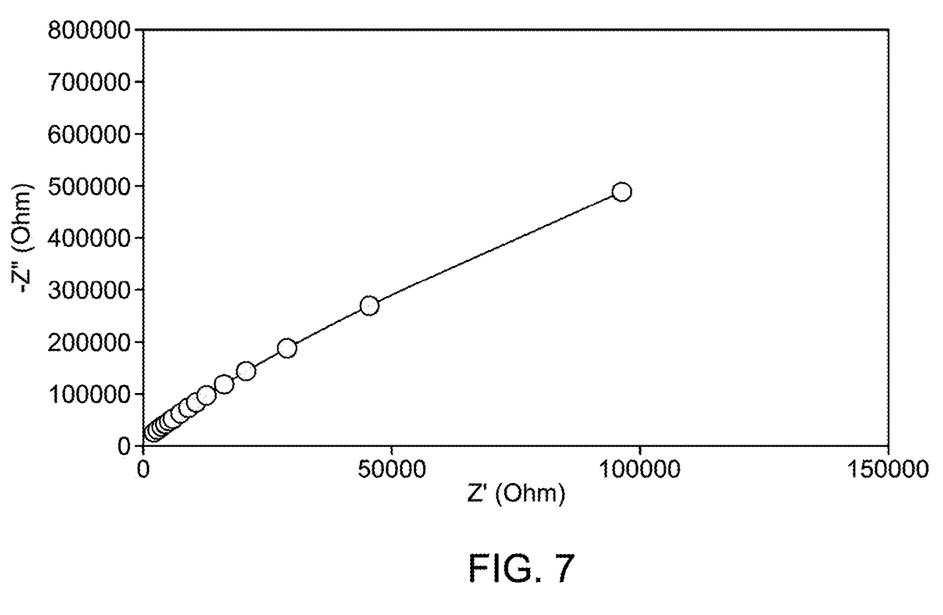
FIG. 7 is a graph depicting the Nyquist ($Z''$-$Z'$) plots of an inventive 10% g-$C_3N_4$@$Fe_2O_3$/$MgAl_2O_4$ nanocomposite.

In general, impedance spectroscopy is a practical and effective method for establishing the relationship between the electrical characteristics and microstructures of substrates. Generally, the electrochemical impedance spectroscopy (EIS) spectra show distinct semicircles in complex impedance planes as they possess diverse relaxation times. The impedance responses caused by the grain border and the grain itself may overlap if the variation in time constants among the processes is less than one hundred. FIG. 7 depicts the complex impedance spectra for the g-$C_3N_4$@$Fe_2O_5$/$MgAl_2O_4$ nanocomposite, from which it can be observed that the complex impedance spectrum shows single depressed semicircle in the complex impedance plots at 303 Kelvin (K), as described by Moguš-Milanković and coworkers in *J. Phys. Chem. B* 2016, 120, 3978-3987, which is incorporated by reference herein.

The aspects of the present disclosure provide the method of storing electrical charge and the nanocomposite for charge storage. A plurality of evaluations were conducted on the nanocomposite as synthesized herein. In particular, electrical conductivity values for the nanocomposite increased with increasing frequency indicating the semiconducting behavior of the sample. The variation of dielectric constant ($\varepsilon'$), dielectric loss ($\varepsilon''$), and ac conductivity for the investigated samples at different frequencies has been examined. Both dielectric constant ($\varepsilon'$) and dielectric loss ($\varepsilon''$) decreased with the increase of frequency while AC conductivity increased. Knop's phenomenological theory explains the frequency variation of ($\varepsilon'$ and $\varepsilon''$). Further, the hopping of electrons and holes is suggested to be the electrical conduction mechanism.

Numerous modifications and variations of the present disclosure are possible in light of the above teachings. It is therefore to be understood that within the scope of the appended claims, the invention may be practiced otherwise than as specifically described herein.

The invention claimed is:

1. A method of storing electrical charge, the method comprising:
    charging a capacitor, comprising an anode and/or a cathode layer comprising a nanocomposite comprising graphitic $C_3N_4$, $Fe_2O_3$, and $MgAl_2O_4$ in a mass relationship to each other in a range of from 5 to 15:2 to 7:75 to 95, with alternating current at a frequency in a range of from 1 to 15 MHz.

2. The method of claim 1, wherein an average pore distribution of the nanocomposite is bimodal, and
    wherein a BET specific surface area of the nanocomposite is in a range of from 15 to 45 $m^2$/g, and/or
    wherein a first average pore diameter of the first mode of the nanocomposite, according to BJH measurement method, is in a range of from 6.3 to 10.03 nm, with a second average pore diameter of the second mode of the nanocomposite, according to BJH measurement method, being in a range of from 7.5 to 13 nm, and/or
    wherein an average pore volume of the nanocomposite, according to the BJH measurement method, is in a range of from 0.06 to 0.12 $cm^3$/g.

3. The method of claim 1, wherein the nanocomposite has a (311) spinel interplanar spacing in a range of from 0.210 to 0.290 nm, a (006) $Fe_2O_3$ interplanar spacing in a range of from 0.180 to 0.260 nm, a (400) spinel interplanar spacing in a range of from 0.140 to 0.220 nm, a (220) MgO interplanar spacing in a range of from 0.108 to 0.188, a (620) spinel interplanar spacing in a range of from 0.090 to 0.170, and a (119) $Fe_2O_3$ and (622) $Fe_2O_3$ spinel interplanar spacing in a range of from 0.080 to 0.160, according to selected area diffraction.

4. The method of claim 1, wherein the mass relationship of the nanocomposite is in a range of from 9 to 11:4 to 6:84 to 86,
    wherein the nanocomposite has a (311) spinel interplanar spacing of 0.25±2% nm, a (006) $Fe_2O_3$ interplanar spacing of 0.22±2% nm, a (400) spinel interplanar spacing of 0.18±2% nm, a (220) MgO interplanar spacing of 0.148±2% nm, a (620) spinel interplanar spacing of 0.13±2% nm, and a (119) $Fe_2O_3$ and (622) $Fe_2O_3$ spinel interplanar spacing of 0.12±2% nm,
    wherein an XRD spectrum of the nanocomposite under Cu-filtered CuKα radiation (1.5418 Å) powered at 45 kV and 10 mA has 20 peaks of
    an $MgAl_2O_4$ spinel phase at 18.9±1, 31.7±1, 44.8±1, 56.2±1, 74.09±1, and 78.1±1°,
    an MgO cubic phase at 42.8±1, 62.2±1, and 74.6±1°,
    an $Fe_2O_3$ hexagonal phase at 36.9±1, 44.8±1, 59.6±1, and 67.3±1°, and
    g-$C_3N_4$-related diffractions at 27.8±1, 36.8±1, 44.6±1, and 67.3±1°, and
    wherein no more than 1% relative intensity $MgFe_2O_4$ is detected in the XRD spectrum.

5. The method of claim 1, wherein the charging is at a frequency in a range of from 5 to 13 MHz,
    wherein the anode and/or a cathode layer comprising the nanocomposite, in operation, becomes an electric double-layer of conductor-rich grains separated by conductor-poor grain boundaries, and wherein the anode and/or a cathode layer comprising the nanocomposite forms an array of homogeneous spherical metal oxides nanoparticles having an average largest diameter in a range of from 5.5 to 8.5 nm on a porous structured layer comprising curled and/or wrinkled nanosheets and platelets of the g-$C_3N_4$.

6. The method of claim 1, wherein carbon materials in the nanocomposite comprise no more than inevitable traces nanotubes, relative to total nanocomposite weight.

7. The method of claim 1, wherein the nanocomposite comprises no more than 1 wt. % of carbonaceous materials besides graphitic $C_3N_4$.

8. The method of claim 1, wherein the nanocomposite comprises no more than 1 wt. % of sulfides, relative to total nanocomposite weight.

9. The method of claim 1, wherein the nanocomposite comprises no more than 0.5 wt. % of Bi.

10. The method of claim 1, wherein the nanocomposite comprises no more than 1 wt. % elemental state Fe, relative to total nanocomposite weight.

11. The method of claim 1, wherein the nanocomposite comprises no more than 1 wt. % elemental state metal, relative to total nanocomposite weight.

12. The method of claim 1, wherein the nanocomposite comprises no more than 1 wt. % $MnO_2$, relative to total nanocomposite weight.

13. The method of claim 1, wherein the nanocomposite comprises no more than inevitable traces of a mercaptan, amine, and/or carboxylic acid functional groups.

14. The method of claim 1, wherein the nanocomposite comprises no more than inevitable traces of C—N heterocycles, and the nanocomposite comprises no more than inevitable traces of silyl functions.

15. The method of claim 1, wherein, relative to a total metal oxide weight, the nanocomposite comprises no more than 10 wt. % MgO, and no more than 1 wt. % $ZrO_2$.

16. The method of claim 1, wherein the nanocomposite comprises no more than 10 wt. %, individually, of ZnO, $Fe_3O_4$, $CeFeO_3$, $GdFeO_3$, $LaFeO_3$, $BaTiO_3$, $CaTiO_3$, $SrTiO_3$, $CaZrO_3$, $PbTiO_3$, $Mg_{1-x}Ni_xFe_2O_4$(x=0.0, 0.6, 1.0), Ag, $CoFe_2O_4$, $CuFe_2O_4$, $MnFe_2O_4$, $NiFe_2O_4$, $ZnFe_2O_4$, $Cu_{1-x}Cd_xFe_2O_4$, $Zn_{0.7}Ni_{0.15}Cu_{0.15}Fe_2O_4$, $Zn_{0.3}Ni_{0.7-x}Co_xFe_2O_4$ (0≤x≤0.7), $Mn_{0.1}Mg_{0.2}$(Co, Ni, Zn)$_{0.7}Fe_2O_4$, $LaCo_{0.5}Fe_{0.5}O_3$, $Mg_{0.1}$—$Co_{0.9}Fe_2O_4$, $La_{1-x}Gd_xCr_{1-y}Ni_yO_3$, $Gd_2FeCrO_6$, $KTaO_3$, $NaTaO_3$, $NaNbO_3$, $KNbO_3$, $Mg_{1-x}Ni_xFe_2O_4$, $Cu_{0.5}Cd_{0.25}Co_{0.25}Fe_{2-x}O_4$, $Zn_{0.5}Co_{0.5}La_xFe_{2-x}O_4$, $Pr_2Ti_2O_7$, $SiO_2$, $TiO_2$, ZnO, ZnS, $Bi_4O_5I_2$, $SrFe_{0.5}Ta_{0.5}O_3$, $La_{0.8}Ba_{0.2}TiO_{3.5-\delta}$, $LaTiO_{3.5-\delta}$, $NaNbO_3$, and $LaFeO_3$.

17. The method of claim 1, wherein the nanocomposite comprises no more than 1 wt. %, individually, relative to total metal content, of any of Au, Zn, Ce, Gd, La, Ba, Ti, Ca, Sr, Zr, Pb, Ni, Ag, Co, Cu, Mn, Cd, Ta, Nb, Pr, and Bi, and wherein the nanocomposite comprises no more than 1 wt. %, individually, relative to total carrier weight, of $SiO_2$, $TiO_2$, ZnO, and ZnS.

18. The method of claim 1, wherein the nanocomposite comprises no more than 5 at. % Fe(III) ions, relative to total iron atoms in the nanocomposite.

19. The method of claim 1, wherein the nanocomposite comprises no more than 1 wt. %, individually, of $SrTiO_3$, Au, $SnO_2$, or SnO.

20. The method of claim 1, wherein the graphitic $C_3N_4$ has no more than 10%, based on its total volume, with a honeycomb structure.

* * * * *